United States Patent [19]

Furrer et al.

[11] Patent Number: 4,770,912

[45] Date of Patent: Sep. 13, 1988

[54] POLYETHYLENE RESIN BLEND

[75] Inventors: William W. Furrer, Denville; Ajit K. Bose, Lawrenceville, both of N.J.

[73] Assignee: Union Camp Corporation, Wayne, N.J.

[21] Appl. No.: 76,584

[22] Filed: Jul. 23, 1987

[51] Int. Cl.⁴ .......................... C08J 5/18; C08L 23/06; C08L 23/08; C08L 23/18

[52] U.S. Cl. ........................................ 428/35; 525/240

[58] Field of Search ............................. 428/35; 525/240

[56] References Cited

U.S. PATENT DOCUMENTS

| | | | |
|---|---|---|---|
| 3,998,914 | 12/1976 | Lillis et al. | 525/240 |
| 4,303,710 | 12/1981 | Bullard et al. | 428/35 |
| 4,330,639 | 5/1982 | Matsuura et al. | 525/240 |
| 4,335,224 | 6/1982 | Matsuura et al. | 525/240 |
| 4,346,834 | 8/1982 | Mazumdar | 428/35 |

FOREIGN PATENT DOCUMENTS

| | | | |
|---|---|---|---|
| 52555 | 5/1982 | European Pat. Off. | 525/240 |
| 58-059242 | 4/1983 | Japan | 525/240 |

*Primary Examiner*—Carman J. Seccuro
*Attorney, Agent, or Firm*—Edward J. Sites

[57] ABSTRACT

A polyethylene resin blend is made up from high molecular weight high density polyethylene resin, a linear low density polyethylene resin, and a very low density polyethylene resin. The blend is useful to fabricate films characterized in part by a softness with relatively high strength.

5 Claims, 1 Drawing Sheet

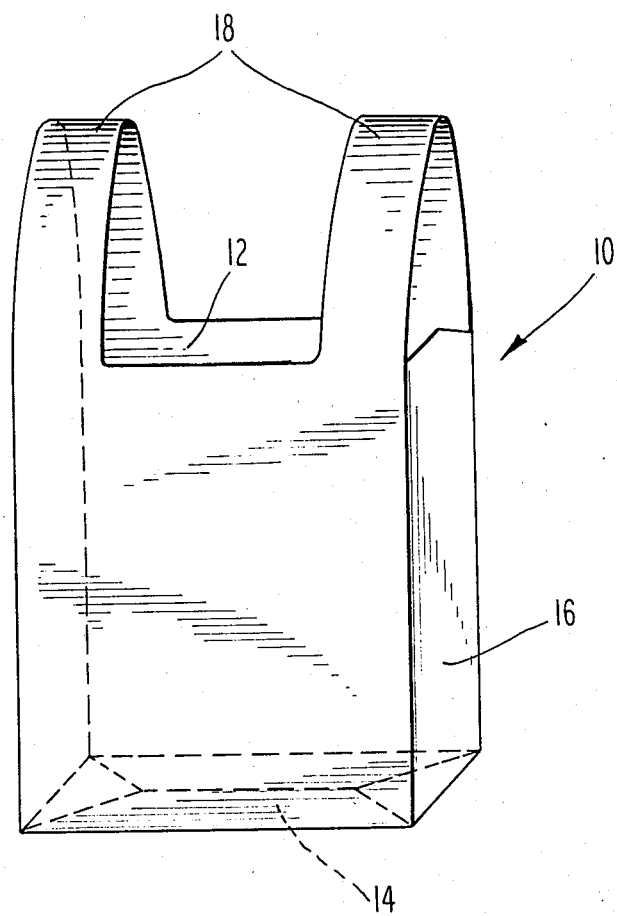

POLYETHYLENE RESIN BLEND

This invention relates to novel polyethylene resin compositions and articles molded from therefrom.

BACKGROUND OF INVENTION

Various different types of polyethylene resins and blends of polyethylene resins having distinctly different physical properties are well known in the art. Representative of prior art disclosures are given in the U.S. Pat. Nos. 4,366,292 (Werner et al., Dec. 28, 1982); 4,336,352 (Sakurai et al., June 22, 1982); 4,339,507 (Kurtz et al., July 13, 1982); 4,426,498 (Inoue et al., Jan. 17, 1984); 4,447,480 (Lustig et al., May 8, 1984); 4,508,872 (McCullough Jr., Apr. 2, 1985); 4,577,768 (Go et al., Mar. 25, 1986); and 4,598,128 (Randall et al., July 1, 1986).

In spite of the wide variety of polyethylene resin compositions heretofore available, there continued to remain a need for polyethylene resin compositions having certain specific physical properties for use in the blown film extrusion. More particularly, there has been a need for polyethylene resin based films which are both soft and have the high strength characteristics required for polyethylene film bags and the like. Of particular need was a polyethylene resin which could be in extruded bags and would both be soft, and of relative high strength.

SUMMARY OF THE INVENTION

In accordance with present invention resin compositions are provided which meets the aforesaid need. The resin compositions of this invention are useful for extruding films which can then be used to fabricate bags and the like of relatively light gauge but useful strength.

The polyethylene resin composition of this invention also comprised of a thermoplastic resin blend, which comprises;

(a) about 30 to 70, and more preferably about 50, weight percent of a polyethylene having a density of at least 0.95 gms/ml and a melt index of from 8-12;

(b) about 20 to 40, more preferably about 30, and most preferably about 40, weight percent of linear polyethylene having a density of from 0.91 to 0.93 gms/ml and a melt index of less than 2.0; and (c) about 10 to 30, more preferably about 20, and most preferably about 10, weight percent of a polyethylene having a density of less than 0.91 gms/ml and a melt index of 0.8 to 1.1.

The term "polyethylene" as used herein means a hompolymer of ethylene and copolymers of ethylene and alphaolefins having 3 to 12 carbon atoms, inclusive.

The invention also comprises films extruded from the compositions of the invention and articles fabricated from the film.

BRIEF DESCRIPTION OF THE DRAWING

The drawing is a view-in-perspective of a bag-type container of the invention.

DETAILED DESCRIPTION OF THE PREFERRED EMBODIMENTS OF THE INVENTION

The resin blends of this invention are prepared by a homogeneous, physical blending of three resin components. The first component is a high molecular weight, high density polyethylene resin (referred to at times for convenience as "HMW-HDPE"). The HMW-HDPE employed is a polyethylene resin characterized in part by a density of at least 0.95 gms/ml, and preferably within the range of from about 0.95 to 0.96 gms/ml as measured according to ASTM test method D-792 and a fractional melt index of from 0.05–0.8 as determined by ASTM test method D-1238 condition E. Such resins are commercially available with a molecular weight average of around 200,000 and a molecular weight distribution ratio [weight-average molecular weight to weight number-average molecular weight (Mw/Mn)]of about 15. The HMW-HDPE resins are generally prepared by polymerizing ethylene, optionally in the presence of an alpha-monoolefin comonomer containing 4 to 12 carbon atoms, in the presence of a metallic catalyst such as chromium oxide. The requisite density and melt index desired is obtained by control of polymerization conditions such as temperature, pressure and comonomer concentration. The necessary conditions are well known to those skilled in the art. In general, the polymerizations are conducted under low pressure (500–600 psia) to obtain substantially linear polymer chains.

The second resin component used to prepare the compositions of the invention is a linear low density polyethylene (referred to hereinafter for convenience as "LLDPE"). This resin component is also well known and commercially available. In general, the LLDPE resin is characterized in part by a density of from about 0.91 to 0.93 gms/ml (ASTM-D-792); preferably 0.918 to 0.920 gms/ml. The commercially available resin will generally have a melt index of less than 2.0, preferably 0.8 to 1.0 as determined by ASTM test method D-1238-70, condition E. The LLDPE resins may be prepared by copolymerization of ethylene with from 4 to 6 mol percent of an alpha-monoolefin containing 3 to 12 carbon atoms. The polymerization technique is well known and is described; for example, in the U.S. Pat. Nos. 4,076,698; 4,354,009; 4,128,607; and in Chem. Eng., Dec. 3, 1979, pp. 80–85.

The very low density polyethylene (referred to at times hereinafter as "VLDPE") resin employed as the third resin component of the compositions of the invention has a density of less than about 0.91 gms/ml, preferably within the range of from about 0.88 to 0.91 gms/ml (ASTM D-792) and a melt-index of 0.8 to 1.1, preferably 1.0 as determined by ASTM Test D-1238-70 condition E. The VLDPE resins are also well known and available commercially. The method of their preparation is well known, and include the copolymerization of ethylene with an alpha-monoolefin containing 3 to 12 carbon atoms. Preferably the comonomer is butene, hexene, octene or a mixture thereof.

The blend compositions of the invention may also include conventional additives, in conventional proportions to facilitate thermoplastic extrusion. Representative of such additives are slip agents such as oleamide, erucamide, stearamide, behenamide and the like; anti-blocking agents; ultra-violet stabilizers; antioxidants; lubricants such as sodium stearate, calcium stearate and the like; anti-static agents; optical brighteners and like additives. Conventional proportions are within the range of from 0.05 to 50 weight percent of the blend composition.

Conventional pigments and/or fillers may also be included in the blends of the invention. Representative of conventionally employed pigments are inorganic and organic pigments. Inorganic pigments are represented by titanium dioxide, iron blue, cadmium pigments, chrome yellow, molybdate orange, ultramarine blue, iron oxide, brown oxide, molybdate red, zinc oxide, zinc chromate, chrome green, chromium oxide, ultramarine green, metallic flakes (bronze, gold, copper), or pearliscent flakes. Typical organic pigments are vat acid dyes, basic dyes anthraquinones, trioindigos, Red Lake C, Red 23, Benzidine yellow, Benzidine orange, dioxanes, Irgazin, Irgalities, phthalocyanines, carbon blacks, azos, or perylenes and mixtures thereof.

The concentration of pigment additive may be at least about 0.1 weight percent, more preferably at least about 0.15 weight percent, and most preferably at least about 0.20 weight percent of the blend composition. Normal pigment loading is 4½–5 lbs/100 lbs resin.

Typical fillers which may be employed in the compositions of the invention are calcium carbonates, clays, talcs, wallostonites, or metallic silicates. The fillers are incorporated into the blend compositions at a concentration level of about 1 to about 60 weight percent, more preferably about 5 to about 50 weight percent, and more preferably about 10 to about 40 weight percent. Preferred fillers are calcium carbonate such as Camel Tex or clay.

Various fibrous reinforcing materials may also be incorporated into the blend compositions of the invention at a concentration level of about 15 to about 25 weight percent. These fibrous materials may be selected from the group comprising chopped glass strands, dacron fibers, and chopped rags.

The three polyethylene resins and any additives such as described above are homogeneously blended together in the desired proportions, employing conventional apparatus and techniques. For example, the blend compositions may be prepared by compounding in an extruder or melt blending the mixture at a thermoplastic processing temperature (circa 350°–400° F.). Kneader extruders may also be used to advantage. The resin components may also be dry blended before feeding to the mixing extruder. The order of mixing is not critical and any order may be taken.

The resin blend compositions of the invention may be used to fabricate articles such as bag carriers or containers using conventional thermoplastic processing apparatus and techniques. For example, films may be extruded and blown to obtain thermoplastic bags using the method described in U.S. Pat. No. 4,626,397. Using such processes one may fabricate bag types of carriers such as shown in the accompanying drawing. In the accompanying drawing, the container 10 is blow molded from a resin of the invention such as described above. The container 10 has an open end 12 and a sealed closed end 14 and a tubular body 16 between ends 12,14. Handle holds 18 are in the zone adjacent to the open end 12. The container 10 is soft but has a relatively high degree of impact resistance and strength.

The following examples describe the manner and the process of making and using the invention and set forth the best mode contemplated by the inventor for carrying out the invention, but are not to be considered as limiting the scope of the invention.

Resin blends were prepared and extruded in an Alpine 50 mm extruder with a 4-inch die system.

EXAMPLE 1

A resin composition was prepared by melt blending in the Alpine 50 mm extruder at a temperature of from about 360°–400° F. a mixture of 50 percent by weight of HMW-HDPE resin (Dupont 5005, E. I. du Pont de Nemours and Company, Wilmington, Del.; density of 0.950 melt index of 0.05), 30 percent by weight of LLDPE (Escorene LPX, Exxon Chemical Co., Darien, Conn. 06820, density of 0.918, melt index of 1.0) and 20 percent by weight VLDPE (Dowlex 615201, Dow Chemical Co., Midland, Mich. 48640, density of 0.910, melt index of 1.0).

A film was extruded having a thickness of about 0.775 mils. Representative portions of the extruded film were subjected to physical testing. The test results are shown in the Table, below.

EXAMPLE 2

The procedure of Example 1 is repeated except that the Escorene as used therein is replaced with 40 percent by weight of LLDPE (Norchem 5010, Northern Petrochemical Co.), density of 0.918, melt index of 1.0) and the proportion of VLDPE (Dowlex 6.5201) is reduced to 10 percent by weight. The physical properties of the extruded film are given in the Table, below.

EXAMPLE 3

(Comparative Example)

This is not an example of the invention, but is made for purposes of comparison.

The procedure of Example 1, surpra., was repeated except that the proportion LLDPE of (Escorene) was increased to 50 percent and the VLDPE was not added. The physical properties of the extruded film are shown in the Table, below.

TABLE

| | | EXAMPLE 1 | EXAMPLE 2 | EXAMPLE 3 (CONTROL) |
|---|---|---|---|---|
| Gauge | | 0.775 | 0.775 | .78 |
| Approx. Density | | 0.935 | 0.933 | 0.935 |
| Tensile Break | MD | 6659 | 6949 | 7251 |
| | TD | 6057 | 6643 | 4856 |
| Tensile Yield | MD | 2601 | 2425 | 2747 |
| | TD | 2647 | 2590 | 2643 |
| Elongation | MD | 457 | 533 | 384 |
| | TD | 543 | 606 | 528 |
| 1% Secant Modulus | MD | 59,764 | 54,813 | 75,885 |
| | TD | 74,852 | 68,839 | 91,524 |
| Tear Strength | MD | 79 | 86 | 32 |
| | TD | 548 | 429 | 583 |
| Impact (gm/mil) | MD | 200 | 159 | 196 |
| | TD | 155 | 123 | — |

MD - machine direction
TD - transverse direction (cross machine direction)

The films made from the resin composition of this invention are substantially softer and have a more supple feel then the controlled sample. The softer feel is attributed to the presence in the polyethylene compositions of the specified amounts of the very low density polyethylene in combination with the other grades of polyethylene.

The physical data shown in the table further establishes that in addition to increasing the softness, most physical properties of the films of this invention, not significantly changed, and certain properties substantially improved. As shown in the above table the films of this invention which are approximately the same thickness and the same density as that of the prior art control film have a definitely improved balance in properties in the machine direction and transverse direction with regard to tensile break properties. More particularly, the films of this invention in the machine direction/transverse direction have properties of 6659/6057 and 6949/6643 verses the relatively unbalanced values for the prior art film of 7251/4826. The relatively insignificant reduction of the machine direction tensile break strength of the films of this invention is more than compensated by the significant increase in the transverse direction strength. This is important in that polyethylene films will tend to fail in the weakest direction, and the balance strength profile obtained in accordance with this invention substantially increases the possible uses of the film because of the overall strength of properties or allows the film thickness and thus cost to be reduced.

Another significant measurement which is shown in the table 1 is 1% secant modulus which objectively measures the relative softness of the films. The lower the reported value for the secant modulus, the softer the films. In this regard it can be seen in the reported values in the table 1 that the films of this invention, as found in subjective evaluation, are significantly softer. For example, the reported values for the 1% secant modulus for the machine direction/transverse direction of the films of this invention are 5976/7485 and 54,815/68,839 as compared to the secant modulus for the prior art film of 75,885/91,524.

The table also shows that the other properties of the films of this invention as compared to the controlled sample are substantially equal to or superior for use in manufacture of plastic bags and the like.

The ability to maintain and/or to improve the physical properties of the polyethylene films while at the same time significantly increasing the softness of the films is a highly advantageous result which has not been heretofore obtained in accordance with the teachings of the prior art.

What is claimed is:

1. A thermoplastic resin blend, which comprises;
   (A) about 30 to 70 weight percent of a high molecular weight polyethylene resin having a density of at least 0.95 gms/ml and a fractional melt index of from 0.05-0.8.
   (B) about 20 to 40 weight percent of a linear low density polyethylene resin having a density of 0.91 to 0.93 gms/ml and a melt index of less than 2.0; and
   (C) about 10 to 30 weight percent of a very low density polyethylene resin having a density of less than 0.91 gms/ml and a melt index of 0.8 to 1.1.

2. The blend of claim 1 wherein there is about 50 weight percent of the high molecular weight polyethylene resin, about 30 weight percent of the linear low density polyethylene resin and about 20 weight percent of very low density polyethylene resin.

3. The blend of claim 1 wherein there is about 50 weight percent of the high molecular weight polyethylene resin, about 40 percent of the linear low density polyethylene resin, and about 10 percent of the very low density polyethylene resin.

4. A thermoplastically extruded film of the resin blend of claim 1.

5. A bag-type container fabricated from the blend of claim 1.